(No Model.)
J. W. BRENNER.
TONGUE SUPPORT.
No. 515,320. Patented Feb. 27, 1894.
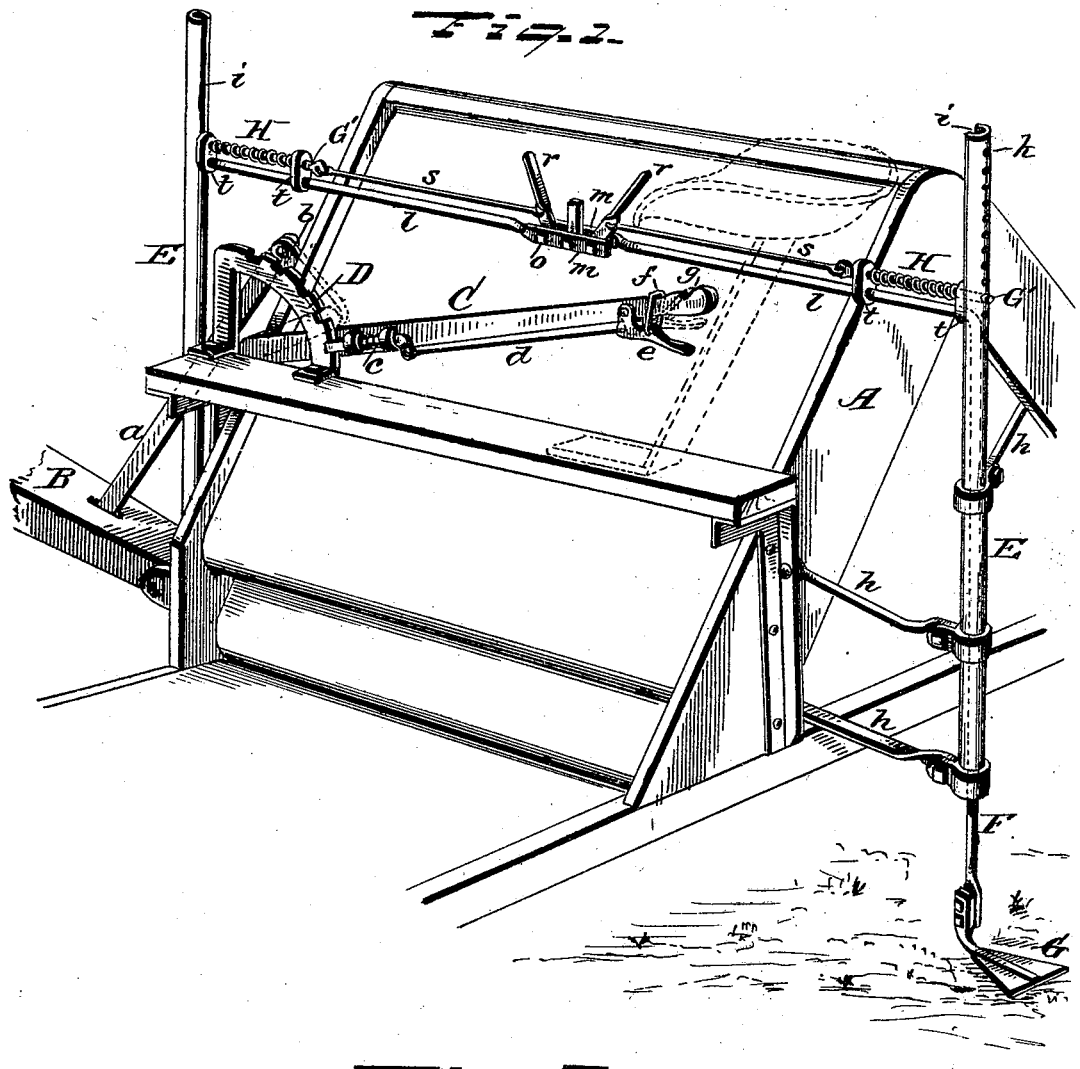
Fig. 1.
Fig. 2.
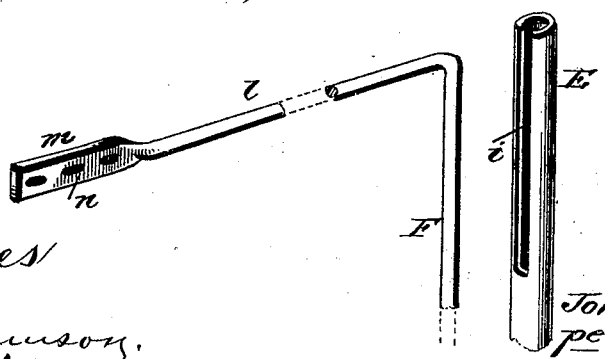
Witnesses
C. J. Williamson
Chas. W. Goddard
Inventor
John W. Brenner
per Chas. H. Fowler
Attorney.

UNITED STATES PATENT OFFICE.

JOHN WESLEY BRENNER, OF BELOIT, IOWA.

TONGUE-SUPPORT.

SPECIFICATION forming part of Letters Patent No. 515,320, dated February 27, 1894.

Application filed September 4, 1893. Serial No. 484,687. (No model.)

*To all whom it may concern:*

Be it known that I, JOHN WESLEY BRENNER, a citizen of the United States, residing at Beloit, in the county of Lyon and State of Iowa, have invented certain new and useful Improvements in Tongue-Supports; and I do hereby declare that the following is a full, clear, and exact description of the same, reference being had to the annexed drawings, making a part of this specification, and to the letters of reference marked thereon.

The present invention has for its object to provide simple and effective means for supporting the tongue and body of all classes of agricultural implements or machines which are mounted upon wheels, and is especially adapted to self-binding harvesters, whereby the weight of the tongue and body of the machine is removed from the horse's neck when the machine is not in motion.

The invention consists in the several details of construction substantially as shown in the drawings and hereinafter described and claimed.

Figure 1 of the drawings represents the rear end of a portion of a self-binding harvester showing my improvement applied thereto; Fig. 2 detail views in perspective of the tubular slotted guide and rod carrying the supporting foot.

In the accompanying drawings A represents the rear end of a self binding harvester of the usual construction, but the invention may be applied to any class of agricultural machine or implement provided with the usual pivoted tongue or pole and mounted upon wheels, and therefore any further description of such machine is considered unnecessary.

The machine is provided with the usual pivoted tongue or pole B which has pivotally connected to it a lifting-bar $a$, and to the upper end of this bar is pivoted a crank-arm $b$ which connects with an operating lever C. To the side of this operating-lever is a spring-actuating latch $c$ to engage with a notched segment D secured in any suitable manner to the frame of the machine.

To the latch is connected one end of a rod $d$, the opposite end of the rod being connected to a hand-grasp $e$ pivoted to the side of the operating lever. By a downward movement of the lever and inward pressure upon the hand-grasp, the tongue or pole, through the medium of the lifting bar and crank-arm, will be raised sufficient to relieve the weight thereof from the horse's neck. When the hand-grasp is released the spring-actuating latch will engage with one of the notches in the segment whereby the tongue or pole is held in an elevated position.

Should it be desired to allow the tongue or pole to work up and down on its pivotal connection independent of the lifting mechanism above described, suitable means are provided for locking the spring actuating latch out of engagement with the notched segment, which means consists in a locking link $f$ pivotally connected to the hand-grasp and adapted for engagement with a notch $g$ upon the end of the lever, as shown in dotted lines, Fig. 1.

Any suitable mechanism may be employed for elevating the tongue or pole and holding it in its elevated position, and I do not therefore wish to be understood as confining the invention to the means shown, as other desirable means may be used with equally as good effect without departing from the principle of my invention.

In connecting with a lifting mechanism for the tongue or pole to support the weight thereof off the horse's neck, it is essential in such class of agricultural machines or implements as self binding harvesters where the wheels do not wholly support the frame but the tongue or pole assists, to provide some means for supporting the elevator and binding end of the harvester, thus taking the weight off the tongue or pole as well as taking the weight of the latter off the horse's neck. To successfully accomplish this object, I provide two tubular slotted guides E, one of which is suitably connected to the frame upon opposite sides thereof.

Any suitable means may be employed for connecting the guides E to the frame of the machine, such as braces $h$, or any other like attachments may be substituted, as I do not wish to confine my invention to any particular means for holding the guides in an upright position, so long as the means employed are sufficiently strong and durable. The guides E at their upper ends have longitudinal slots $i$ and diametrically opposite thereof are a plurality of holes $k$, the purpose of which will be hereinafter described.

Extending down through the guides are supporting rods F provided at their lower ends with fan-shaped feet G to rest on the ground as shown in Fig. 1 and support the frame of the machine. The supporting rods F at their upper ends terminate in horizontal arms $l$ which extend inwardly and have at their extremities clip plates $m$ which are suitably connected together as shown. The plates $m$ have elongated holes $n$ through which the bolts $o$ extend, thus enabling the plates to be adjusted to increase or diminish the distance between the supporting-arms F and adapt them to the distance between the guides E.

Between the plates $m$ are pivoted hand-grasps $r$ to which are connected rods $s$, and to the outer ends of these rods are connected spring actuating bolts G' which engage with the holes $k$ in the guides E to lock the supporting rods F in their adjusted position. The inner ends of the bolts G' extend through guides $t$ upon the arms $l$ so as to retain them in a true line to engage with the holes $k$ when the hand-grasps are released.

When the machine is stationary the weight thereof is effectually removed from the tongue or pole by simply pressing together the hand-grasps $r$ and through the connecting rods $s$ the bolts H will be disengaged with the holes $k$ in the guides E and thus allow the rods F to fall by gravity until the feet G rest upon the ground, after which the hand-grasps are released and the spring of the bolts will force them forward to engage with the holes $k$ thereby securely holding the rods F in their adjusted position and supporting the weight of the machine at the rear end to relieve it from the tongue.

When not required for use the feet G are raised from contact with the ground by first disengaging the bolts G' through the medium of the hand-grasps $r$ and connecting rods $s$ with one hand and with the other hand raising the horizontal arms $l$, which arms being integral with the supporting rods F, said rods will also be raised.

The supporting rods with their feet are held suspended from off the ground when not in use by the same means that hold them when brought in use to support the frame of the machine.

Any desirable means may be employed for locking and holding the supporting rods in a depressed or elevated position as found best adapted to the purpose.

Having now fully described my invention, what I claim as new, and desire to secure by Letters Patent, is—

1. In an agricultural machine or implement, the combination with a suitable tongue-support, of means for supporting the frame to take the weight off the tongue, consisting of vertically adjustable rods with feet at their lower ends, and means for locking the rods in their adjusted position, substantially as and for the purpose described.

2. In an agricultural machine or implement, means for supporting the frame to take the weight thereof off the tongue, consisting of tubular slotted guides, adjustable supporting rods located therein and having feet at their lower ends, said rods terminating at their upper ends in horizontally extending arms which are adjustably connected to each other and means for locking the supporting rods in position when either raised or lowered, substantially as and for the purpose described.

3. In an agricultural machine or implement, means for supporting the frame thereof, consisting of tubular slotted guides having holes at their upper ends, supporting rods with feet at their lower ends, said rods being adjustable within the guides, and means for locking the rods in their adjusted position, consisting of spring actuating bolts adapted to engage with the holes in the guides, and pivoted hand-grasps and connecting rods for operating the bolts, substantially as and for the purpose set forth.

4. In an agricultural machine or implement, the combination with a suitable tongue support, of means for supporting the frame and taking the weight off the tongue, consisting of tubular slotted guides, and supporting rods adjustable within the guides and having at their lower ends suitable feet, and means for locking the rods in their adjusted position, substantially as and for the purpose set forth.

5. In an agricultural machine or implement, a tongue-support consisting of a lifting-bar pivoted thereto, an operating lever connecting therewith, a notched segment, a spring actuating latch adapted to engage therewith, means for operating it, and means for locking the latch out of engagement with the segment, and adjustable supports for the frame of the machine to take the weight thereof off the machine, substantially as and for the purpose specified.

6. In an agricultural machine or implement, a suitable tongue support and means for supporting the frame of the machine to take the weight off the tongue, consisting of tubular slotted guides, supporting rods with feet, said rods adjustable within the guides and having at their upper ends horizontal arms adjustably connected to each other, and means for locking the rods in their adjusted position, substantially as and for the purpose described.

In testimony that I claim the above I have hereunto subscribed my name in the presence of two witnesses.

JOHN WESLEY BRENNER.

Witnesses:
L. E. TILLOTSON,
D. J. CARPENTER.